United States Patent
Itadani et al.

(10) Patent No.: US 8,237,900 B2
(45) Date of Patent: Aug. 7, 2012

(54) METHOD FOR PRODUCING LONG OBLIQUELY STRETCHED FILM

(75) Inventors: Motohiro Itadani, Tokyo (JP); Takashi Sato, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 12/914,583

(22) Filed: Oct. 28, 2010

(65) Prior Publication Data

US 2011/0097546 A1    Apr. 28, 2011

Related U.S. Application Data

(62) Division of application No. 12/085,595, filed as application No. PCT/JP2006/323639 on Nov. 28, 2006.

(30) Foreign Application Priority Data

Nov. 28, 2005    (JP) .................................. 2005-341893

(51) Int. Cl.
    *G02F 1/1335*    (2006.01)
(52) U.S. Cl. ...................................................... 349/118
(58) Field of Classification Search .................. 349/118
    See application file for complete search history.

(56) References Cited

U.S. PATENT DOCUMENTS

| 6,658,708 | B2 * | 12/2003 | Fukuzawa et al. ................. 26/91 |
| 6,746,633 | B2 | 6/2004 | Sakamaki et al. |
| 7,354,632 | B2 * | 4/2008 | Murakami et al. ............. 428/1.3 |
| 8,054,441 | B2 * | 11/2011 | Nakamura et al. ............ 349/193 |
| 2003/0159259 | A1 * | 8/2003 | Fukuzawa et al. ................. 26/91 |
| 2004/0100708 | A1 * | 5/2004 | Noda et al. ..................... 359/883 |
| 2004/0241344 | A1 * | 12/2004 | Kawanishi et al. ............ 428/1.1 |
| 2008/0252827 | A1 * | 10/2008 | Hirai et al. ....................... 349/96 |

FOREIGN PATENT DOCUMENTS

| JP | 2004-205972 A | 7/2004 |
| JP | 2005-089642 A | 4/2005 |
| JP | 2005-262679 A | 9/2005 |
| JP | 2005-321542 A | 11/2005 |

* cited by examiner

*Primary Examiner* — Timothy L Rude
(74) *Attorney, Agent, or Firm* — Birch, Stewart, Kolasch & Birch, LLP (57) ABSTRACT

A long obliquely stretched film is obtained having an orientation axis in a direction with an angle θs of 10° or more and 85° or less from a width direction by grasping both side ends in the width direction of a longitudinally stretched film with an average retardation $Re_1$ by grasping means; stretching the film under a condition that a long obliquely stretched film sample with an average retardation $Re_2$ ($Re_2$ is smaller than $Re_1$) can be obtained and traveling speeds of the grasping means are substantially equal at the film both side ends through a preheating zone, a stretching zone and a fixing zone; releasing the both side ends of the film from the grasping means; and taking it up around a winding core.

15 Claims, 2 Drawing Sheets

METHOD FOR PRODUCING LONG OBLIQUELY STRETCHED FILM

This application is a Divisional of co-pending application Ser. No. 12/085,595 filed on Jul. 17, 2008, which is a national stage application of PCT International Application No. JP/2006/323639 filed on Nov. 28, 2006, which claims priority on Japanese Application No. 2005-341893 filed on Nov. 28, 2005. The entire contents of each of these applications is hereby incorporated by reference.

TECHNICAL FIELD

The present invention relates to a method for producing a long obliquely stretched film, a method for producing a retarder, and a liquid crystal display device comprising the retarder.

BACKGROUND ART

In a liquid crystal display device, various retarders are used for optical compensation such as prevention of coloring and expansion of view angles. Retarders used in the liquid crystal display device are in a rectangular shape in general and have an orientation axis in a direction inclined with respect to a side thereof. In a liquid crystal display devices, such a retarder is laminated on a polarization plate such that the orientation axis of the retarder and a polarization transmission axis of the polarization plate get into a desired angle.

As a method of manufacturing a retarder having an orientation axis in a direction inclined with respect to its side as above, such a method is widely known that a transparent resin film (raw material film) is stretched longitudinally or laterally to be oriented so as to obtain a long stretched film and then the stretched film is cut in a rectangular shape with a predetermined angle with respect to the side of the stretched film. However, with this method, even if cutting is done so that the maximum area can be obtained, a cutting loss is generated all the time to lower use efficiency of the stretched film, which is a problem. On the other hand, a long stretched film oriented obliquely with a predetermined angle can be cut away in parallel with the side to increase use efficiency of the stretched film.

A method of obtaining a film with a obliquely oriented orientation axis by stretching has been known. For example, in Patent Document 1, a method for producing a obliquely stretched film which is stretched in a direction oblique to a film longitudinal direction is disclosed in which both side ends of a film is grasped between two rows of chucks running on tenter rails arranged so that traveling distances of the chucks in a predetermined traveling section are different and is made to travel.

Patent Document 2 discloses a method of stretching an optical polymer film characterized in that, in a method of stretching an optical polymer film stretched by giving a tension while holding both side ends of a continuously supplied polymer film by holding means and advancing the holding means in a longitudinal direction of the film, stretching is performed while a locus L1 of the holding means from a substantial hold start point to a substantial hold release point at one side end of the polymer film and a locus L2 of the holding means from the substantial hold start point to the substantial hold release point at another side end of the polymer film, and a distance W between the two substantial hold release points satisfy a relation of |L2−L1|>0.4 W, bearing properties of the polymer film are maintained and a state where a volatile component content is 5% or more is present and then, the volatile component content is lowered while the film is made to shrink.

Patent Document 3 discloses a method for producing a long optical film having an optical axis (orientation axis) being in a direction neither in parallel nor perpendicular to a flow direction of the long film obtained by stretching a long film made of a thermoplastic resin, in which the method for producing a long optical film characterized in that, in a region where the film is substantially stretched, stretching is performed so that magnitude of moving speeds at both opposing side ends in the width direction of the films are equal and the traveling distances are different, and at least one of a pair of jigs holding the width-direction both side ends of the film is moved on a rail in a waved shape with respect to the film surface. Moreover, Patent Document 3 describes that the stretching process may be repeated several times or the stretching process may be performed after stretching in a longitudinal direction or a lateral direction in advance.

However, with these obliquely stretching methods, wrinkles or twists can easily occur obliquely. Thus, it is substantially impossible to obtain a wide film having a uniform thickness in the width direction and an orientation axis uniformly oriented in an oblique direction at 10° or more and 85° or less. Thus, it has not been possible to mass-produce a long and wide optical film industrially in which an orientation axis is oriented obliquely (in a direction largely offset from the film width direction or longitudinal direction).

Patent Document 1: Japanese Patent Laid-Open No. 2-113920
Patent Document 2: Japanese Patent Laid-Open No. 2002-86554 (corresponding to U.S. Pat. No. 6,746,633)
Patent Document 3: Japanese Patent Laid-Open No. 2003-232928

DISCLOSURE OF THE INVENTION

Problems to be Solved by the Invention

An object of the present invention is to provide a method for producing a wide and long stretched film or retarder film having a uniform thickness in the width direction and an orientation axis uniformly oriented in an oblique direction at 10° or more and 85° or less, a retarder film obtained by the method, and a liquid crystal display device comprising the retarder film.

Means for Solving the Problems

The inventors have earnestly proceeded with studies in order to achieve the above object and found that in two-stage stretching which obliquely stretching is performed after longitudinal stretching, by controlling a relation of average retardations generated in the longitudinal stretching and obliquely stretching, respectively, and a stretching angle of the obliquely stretching, or specifically by stretching a film with an average retardation $Re_1$ obtained by longitudinally stretching in a direction with an angle θe oblique to the width direction under a condition that a long obliquely stretched film sample with the average retardation $Re_2$ ($Re_2$ is smaller than $Re_1$) is obtained from a raw material film with substantially zero average retardation, a obliquely stretched film with a uniform width-direction thickness having an orientation axis in a direction at 10° or more and 85° or less from the width direction and in a direction with an angle larger than the above θe and no wrinkles or twists can be obtained. And the present invention has been completed based on this finding.

According to the present invention, (1) a method for producing a long obliquely stretched film having an orientation axis in a direction with an angle θs of 10° or more and 85° or less from the width direction, the method comprising:

a) a step of longitudinally stretching a long raw material film to obtain a longitudinally stretched film with an average retardation $Re_1$; and a step of stretching the longitudinally stretched film in a direction with an angle θe oblique to the width direction, wherein b) the step of stretching in the direction with the angle θe is performed under a condition that a long obliquely stretched film sample with the average retardation $Re_2$ ($Re_2$ is smaller than $Re_1$) is obtained from the long raw material film;

(2) the method for producing a long obliquely stretched film according to the above (1), in which a stretching temperature of the stretching step in the direction of the angle θe is higher than a stretching temperature of the step of longitudinal stretching; and (3) the method for producing a long obliquely stretched film according to the above (1) or (2), in which a stretching magnification of the stretching step in the direction at the angle θe is smaller than a stretching magnification of the longitudinal stretching step are provided.

Also, according to the present invention, (4) a method for producing a long obliquely stretched film having an orientation axis in a direction with an angle θs of 10° or more and 85° or less from the width direction, the method comprising:

a) a step of winding a longitudinally stretched film off a winding body of the longitudinally stretched film with the average retardation $Re_1$ obtained by longitudinally stretching a long raw material film; a step of grasping both side ends in the width direction of the longitudinally stretched film by grasping means; a step of stretching the longitudinally stretched film in the direction of the angle θe oblique to the width direction through a preheating zone, a stretching zone and a fixing zone to obtain a obliquely stretched film; a step of releasing the both side ends of the obliquely stretched film from the grasping means; and a step of taking up the obliquely stretched film around a winding core, wherein b) the step of stretching in the direction of the angle θe is performed under a condition that a long obliquely stretched film sample with the average retardation $Re_2$ ($Re_2$ is smaller than $Re_1$) is obtained from the long raw material film; and c) traveling speeds of the grasping means are substantially equal at both side ends of the film is provided.

As a preferred mode of the present invention, (5) a method for producing a long obliquely stretched film according to the above (4), in which a film running direction in the fixing zone is inclined with an angle of θ1 from the film running direction in the preheating zone and the angle θ1 is not more than θe is provided.

Moreover, according to the present invention, (6) a long obliquely stretched film obtained by the method according to any one of the above (1) to (5);

(7) a long laminate film obtained by laminating the long obliquely stretched film according to the above (6) and a long polarizer with their longitudinal directions aligned;

(8) a method for producing a retarder comprising a step of trimming the long obliquely stretched film according to the above (6) to a predetermined size along a direction perpendicular to or parallel with its longitudinal direction;

(9) a method for producing a polarizing plate including a step of trimming the long laminate film according to the above (7) to a predetermined size;

(10) a liquid crystal display device comprising the retarder obtained by the method according to the above (8).

(11) a liquid crystal display device comprising a polarizing plate obtained by the method according to the above (9); and (12) a liquid crystal display device according to the above (10) or (11) comprising a reflective-type liquid crystal panel are provided.

Advantages of the Invention

According to a producing method of the present invention, a wide and long obliquely stretched film can be easily obtained in which a thickness in the width direction is uniform and an orientation axis is uniformly oriented in a direction at 10° or more and 85° or less, preferably 12° or more and 85° or less, more preferably 40° or more and 85° or less, or particularly preferably 51° or more and 85° or less with respect to the width direction. The long stretched film with the obliquely oriented orientation axis is suitable as a retarder of a liquid crystal display device and the like. Specifically, when laminated with other long optical elements used for a liquid crystal display device such as a polarizing plate with an orientation axis inclined at a given angle, by using the stretched film having an orientation axis oblique to the longitudinal direction, lamination by roll-to-roll with other long optical elements can be realized. Since a film having an orientation axis in parallel with the width direction (TD direction) or longitudinal direction (MD direction) of a long film needs diagonal trimming, that leaves a large waste portion. Since the stretched film having an orientation axis oblique to the MD direction obtained by the producing method in the present invention may be trimmed in parallel with the MD direction or TD direction, that leaves little film waste portion, which is excellent in productivity. Also, the retarder obtained by the producing method in the present invention has a wider view angle of its display screen when used in a liquid crystal display device, particularly in a reflective-type liquid crystal display device, and can result in preventing drop in contrast or coloring of the display screen.

EXPLANATION OF SYMBOLS

1: film
10: temperature-controlled room
11: rail
12: grasping means
13: boundary between preheating zone and stretching zone
14: boundary between stretching zone and fixing zone
21: wind-off roll
22: wind-up roll
47: running direction of film in preheating zone
49: running direction of film in fixing zone
S1, S2: stretching start point
E1, E2: stretching end point

BEST MODE FOR CARRYING OUT THE INVENTION

A method for producing a long obliquely stretched film having an orientation axis in a direction with an angle θs of 10° or more and 85° or less from the width direction according to the present invention comprises a) a step of longitudinally stretching a long raw material film to obtain a longitudinally stretched film with an average retardation $Re_1$; and a step of stretching the longitudinally stretched film in a direction with an angle θe oblique to the width direction; b) in which the step of stretching in the direction with the angle θe is performed under a condition that a long obliquely stretched film sample with the average retardation $Re_2$ ($Re_2$ is smaller than $Re_1$) is obtained from the long raw material film.

The long raw material film used in the present invention is a long film made of a transparent resin. The term long means those having a length of at least approximately 5 times or more of a width of a film or a laminate body, and preferably having a length of 10 times or more; and more specifically having a length being such an extent that is wound in a roll state for storage or transport. The transparent resin is a resin which is transparent to a desired wavelength. The transparent resin is preferably a thermoplastic resin. Also, the transparent resin is preferably a resin with a positive specific birefringence value. The transparent resins include polycarbonate resin, polyethersulphone resin, polyethylene terephthalate resin, polyimide resin, polymethylmethacrylate resin, polysulphone resin, polyarylate resin, polyethylene resin, polyvinylchloride resin, diacetylcellulose, triacetylcellulose, polystyrene resin, polyacryl resin, olefin polymer having alicyclic structure (alicyclic olefin polymer) and the like. Among them, alicyclic olefin polymer is preferable.

The olefin polymers having alicyclic structure include norbornene resin, single-ring cyclic olefin resin, cyclic conjugated diene resin, vinyl alicyclic hydrocarbon resin, and hydrogenated product thereof. Among them, norbornene resin has favorable transparency and molding property and can be suitably used.

The norbornene resins include a ring-opening polymer of monomer having a norbornene structure or a ring-opening copolymer of monomer having a norbornene structure and another monomer, or hydrogenated product thereof, an addition polymer of monomer having a norbornene structure or an addition copolymer of monomer having a norbornene structure and another monomer, or hydrogenated product thereof and the like.

The transparent resin used in the present invention has a glass transition temperature of preferably 80° C. or more, and more preferably 100 to 250° C. Also, an absolute value of photoelastic coefficient of the transparent resin is preferably $10 \times 10^{-12}$ $Pa^{-1}$ or less, more preferably $7 \times 10^{-12}$ $Pa^{-1}$ or less, and particularly preferably $4 \times 10^{-12}$ $Pa^{-1}$ or less. The photoelastic coefficient C is a value represented by $C = \Delta n/\sigma$ when birefringence is $\Delta n$ and a stress is $\sigma$. Using of the transparent resin with the photoelastic coefficient in this range can result in restricting a phenomenon of a change in a hue at an edge portion of a display screen in a liquid crystal display device when a obliquely stretched film obtained by the method of the present invention is applied to the liquid crystal display device.

The transparent resin used in the present invention may be mixed with compounding agent such as coloring agent such as pigment and dye, fluorescent brightening agent, dispersing agent, heat stabilizer, light stabilizer, ultraviolet absorber, antistatic agent, antioxidant, lubricant, solvent and the like as appropriate.

The raw material film used in the present invention may be a single-layer film or multi-layer film. Also, the raw material film is preferably supplied as a winding body that the raw material film is wound around a winding core.

In the producing method in the present invention, first, the above-mentioned long raw material film is longitudinally stretched. The longitudinal stretching is to stretch the film in a direction in parallel with the longitudinal direction of the raw material film. A method of longitudinal stretching is not particularly limited, for example, a method of stretching by a difference in rotating speeds between rolls can be mentioned.

A longitudinally stretched film having the orientation axis in the direction substantially parallel with the longitudinal direction and the average retardation $Re_1$ can be obtained by the longitudinal stretching. The average orientation angle of the orientation axis of the longitudinally stretched film is usually more than 85° and no more than 90°, and preferably more than 89° and no more than 90° with respect to the film width direction. The longitudinally stretched film is preferably wound around a winding core to have a winding body to be supplied to the subsequent processes. Stretching conditions such as a stretching temperature $T_1$, stretching magnification $R_1$, speed $V_1$ and the like in the longitudinal stretching are not particularly limited, but the stretching temperature $T_1$ is preferably Tg−20° C. or more and Tg+30° C. or less, the stretching magnification $R_1$ is preferably 1.01 times or more and 10.0 times or less, and the speed $V_1$ is preferably 1 m/min or more and 200 m/min or less. Tg is a glass transition temperature of the transparent resin constituting the raw material film. In this specification, angles are noted by inferior angles (smaller angles).

Next, this longitudinally stretched film is stretched in a direction with the angle θe oblique to the width direction. A condition of stretching at the oblique angle θe is a condition by which a long obliquely stretched film sample with the average retardation $Re_2$ is obtained from the long raw material film. Here, $Re_2$ is smaller than $Re_1$, preferably smaller than 0.5 times of $Re_1$. A obliquely stretched film having an orientation axis in a direction larger than the angle θe and largely different from the angle θe, small retardation (Re) fluctuation or small thickness fluctuation in the plane direction, and the orientation axis uniformly oriented can be obtained by the stretching under such conditions.

Therefore, with the method of the present invention, the angle θe can be made smaller than the angle θs. By making the angle θe smaller, Re fluctuation, orientation angle fluctuation and thickness fluctuation of the obliquely stretched film obtained by the method of the present invention can be further reduced over the wide width of 1300 mm or more.

In order to make $Re_2$ smaller than $Re_1$, the stretching temperature of the step of stretching in a direction of the angle θe is set higher than the stretching temperature of the step of longitudinal stretching; the stretching magnification of the step of stretching in a direction of the angle θe is set smaller than the stretching magnification of the step of longitudinal stretching; the stretching speed and stretching means (uniaxial stretching or biaxial stretching) are adjusted; or these conditions are combined.

The stretching magnification of the longitudinal stretching is acquired from the amount of length change in the longitudinal direction, while the stretching magnification of the oblique stretching is acquired from the amount of length change in the width direction.

The angle θe is preferably 5° or more and 45° or less, more preferably 5° or more and 30° or less, and further preferably 5° or more and 15° or less. The angle θe is an angle by which a film having an orientation axis in a direction of an angle Φ with respect to the width direction can be obtained from a long raw material film. The angle Φ is preferably 5° or more and 45° or less, more preferably 5° or more and 30° or less, further preferably 5° or more and 15° or less. If the angle θe or the angle Φ is in this range, fluctuations in retardation (Re) in the in-plane direction, orientation angle and thickness of the obliquely stretched film obtained by the method of the present invention can be further reduced over the wide width of 1300 mm or more.

In order to have this obliquely stretching step specifically understood, explanation will be made referring to figures showing an example of the obliquely stretching step.

Figure 1:
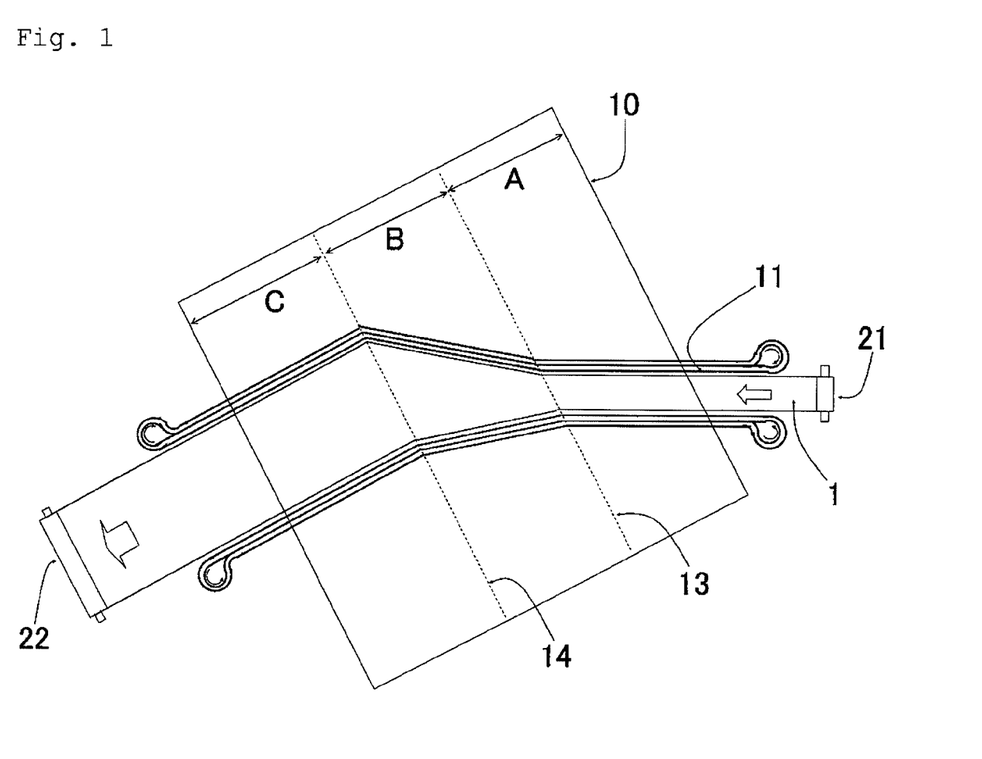
FIG. 1 a conceptual diagram illustrating an example of a tenter stretching machine to which a producing method in the present invention can be suitably applied.
Figure 2:
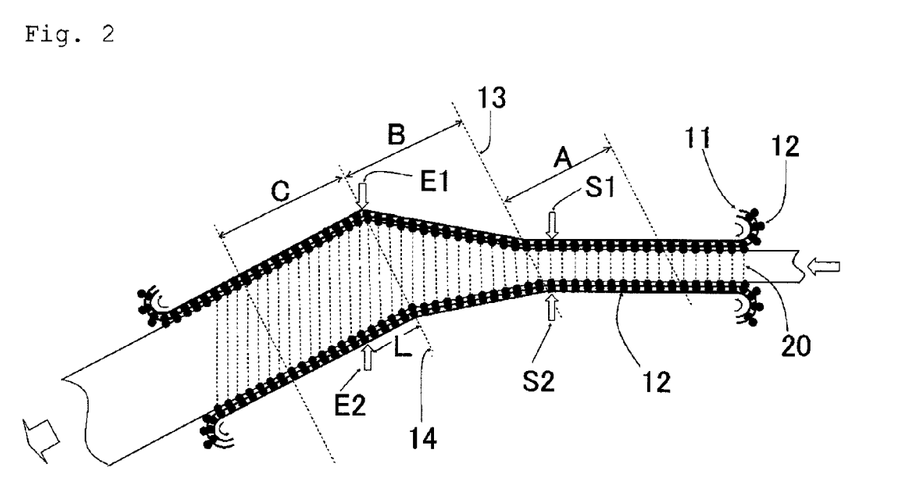
FIG. 2 a diagram illustrating grasping means of a rail portion in the stretching machine in FIG. 1.
Figure 3:
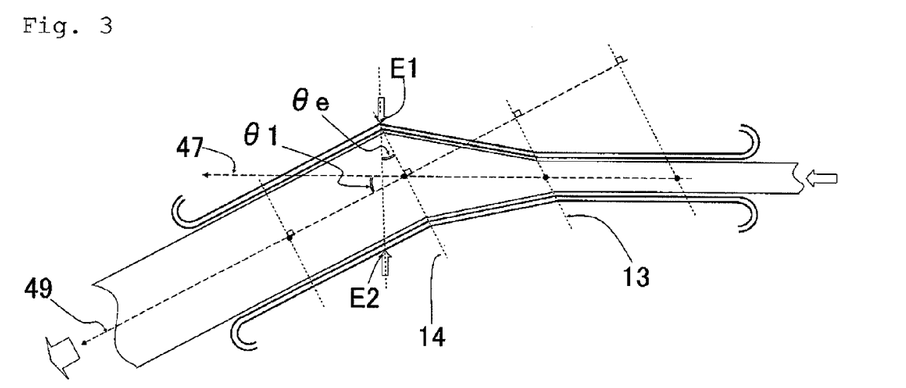
FIG. 3 a diagram for explaining rail arrangement in the stretching machine in FIG. 1.

FIG. 1 is a conceptual diagram illustrating an example of a tenter stretching machine that can suitably put the producing method of the present invention into practice. FIG. 2 is a diagram illustrating grasping means of a rail portion in the stretching machine in FIG. 1. FIG. 3 is a diagram for explaining rail arrangement in the stretching machine in FIG. 1. The angle θe is a smaller angle (inferior angle) formed by a line connecting stretch end points E1 and E2 and the film width direction in the fixing zone. A definition of the stretch end point will be described later.

The tenter stretching machine shown in FIG. 1 comprises a wind-off roll (winding body of longitudinally stretched film) 21, a wind-up roll 22, a temperature-controlled room 10 composed of a preheating zone A, a stretching zone B and a fixing zone C, a rail 11 on which the grasping means travels to transport the film and the grasping means 12 (the grasping means is not shown in FIGS. 1 and 3).

The grasping means 12 grasps the both side ends of the longitudinally stretched film wound off the wind-off roll 21, the longitudinally stretched film is guided into the temperature-controlled room composed of the preheating zone A, the stretching zone B and the fixing zone C to be obliquely stretched. And the obliquely stretched film is released before the wind-up roll 22. The obliquely stretched film released from the grasping means is taken up by the wind-up roll 22. The pair of right and left rails 11 have a continuous endless track without a terminal and returns the grasping means having traveled as above from an outlet side to an inlet side of the temperature-controlled room.

A longitudinally stretched film 1 is stretched by a tension from the grasping means while passing through the temperature-controlled room composed of the preheating zone, the stretching zone and the fixing zone.

In the preheating zone, the stretching zone and the fixing zone, a predetermined temperature can be set respectively and the temperature is usually kept constant in each zone. The temperature of each zone can be selected as appropriate, but with respect to the glass transition temperature Tg (° C.) of the transparent resin composing the film, the preheating zone has Tg to Tg+30 (° C.), the stretching zone has Tg to Tg+20 (° C.), and the fixing zone has Tg to Tg+15 (° C.).

In the present invention, a temperature difference may be provided in the width direction in the stretching zone for controlling thickness fluctuation in the width direction. Particularly in the present invention, the temperature close to the grasping means is preferably set higher than that of the film center portion. In order to provide the temperature difference in the width direction of the stretching zone, employed can be a known method such as a method of adjusting an opening degree of a nozzle for feeding hot air into the temperature-controlled room so that the degree is different depending on the width direction or a method of controlling heaters aligned in the width direction for heating. The lengths of the preheating zone, the stretching zone, and the fixing zone can be selected as appropriate, and with respect to the length of the stretching zone, the length of the preheating zone is usually 100 to 150% and the length of the fixing zone is usually 50 to 100%.

The grasping means 12 travels on the rail 11 capable of deformation of arrangement, for example. The rail 11 is arranged so that the film is stretched with the desired angle θe. In FIG. 1, the rail arrangement is set so that the film running direction is made as will be described later. In the present invention, the film running direction is a direction of a tangential line connecting mid points in the film width direction from the wind-off roll to the wind-up roll.

At a boundary 13 between the preheating zone and the stretching zone and a boundary 14 between the stretching zone and the fixing zone, a partition plate having a slit though which the film can pass is installed. The boundary between the preheating zone and the stretching zone and the boundary between the stretching zone and the fixing zone, that is, the partition plates are preferably at right angles to a film running direction 49 in the fixing zone.

The preheating zone A is a zone for transporting the film while warming the film without substantially changing the film length in a direction perpendicular to a film running direction 47 in the preheating zone. The film running direction in the preheating zone is a direction in parallel with the direction where the film is wound off the wind-off roll and it usually is perpendicular to the rotating shaft of the wind-off roll.

The stretching zone B is a zone for transporting the film while increasing the film length in a direction perpendicular to the film running direction in the stretching zone. The film running direction in the stretching zone is, in the rail arrangement where the stretching zone is widened at a given angle without changing its inclination as in FIG. 1, a direction of a straight line connecting a mid point of the film at the boundary between the preheating zone and the stretching zone to a mid point of the film in the boundary between the stretching zone and the fixing zone.

The film running direction in the stretching zone matches the film running direction 47 in the preheating zone in FIG. 1, but it may be out of line. In the case of out of line, it is preferable to be out of line in the direction to upward from the film running direction in the preheating zone in FIG. 1.

The fixing zone C is a zone for transporting the film while cooling the film without substantially changing the film length in a direction perpendicular to the film running direction 49 in the fixing zone. The film running direction 49 in the fixing zone is a direction parallel with the direction in which the film is taken up by the wind-up roll and usually is perpendicular to a rotating shaft of the wind-up roll.

In the producing method in the present invention, film faces in the preheating zone, stretching zone and fixing zone are preferably substantially parallel with each other. That is, the film wound off the wind-off roll preferably passes the preheating zone, stretching zone and fixing zone without being twisted but staying flat and is taken up by the wind-up roll.

In the producing method in the present invention, c) traveling speeds of the grasping means are substantially equal at both side ends of the film. In FIG. 2, a broken line is shown between the opposing pair of grasping means. Stretching starts in the neighborhood of the stretching start point and ends in the neighborhood of the stretching end point. The stretching start point is a point where an interval between the pair of grasping means begins to be widened, and it is S1 and S2 in FIG. 2. The stretching end point is a point where the interval between the pair of grasping means begins to be constant, and it is E1 and E2 in FIG. 2.

The traveling speed of the grasping means can be selected as appropriate but it is usually 10 to 100 m/minute. A difference in traveling speeds of the right and left pair of grasping means is usually 1% or less, preferably 0.5% or less, more preferably 0.1% or less of the traveling speed.

In the method for producing an obliquely stretched film in the present invention, as shown in FIG. 3, c) the film running direction 49 in the fixing zone is inclined by an angle θ1 from the film running direction 47 in the preheating zone. The rail is bent downward in FIG. 3, but it may be bent upward in line symmetry with the line of the film running direction of the preheating zone in FIG. 3 as its axis. The angle θ1 is preferably the angle θe or less, more preferably (θe−4°) or more and θe or less.

In the stretching zone, the film running direction may be straight without changing the direction, or may be changed in a stepwise or continuously. The spread angle of the rail can be selected as appropriate according to the stretching magnification.

The running direction in the fixing zone is inclined from the running direction in the preheating zone by an angle of θ1 as shown in FIG. 3. Thus, the upper grasping means in the figure takes a longer route than the lower grasping means. Therefore, in FIG. 2, when the upper grasping means reaches the point E1, the corresponding lower grasping means has reached the point E2. When seen from the film width direction of the fixing zone, E2 advances to a position ahead of E1.

The film passed through the temperature-controlled room as above is released from the grasping means before the wind-up roll and taken up by the wind-up roll. The film obtained as above has an orientation axis inclined by an angle θs of 10° or more and 85° or less, preferably 40° or more and 85° or less, and more preferably 51° or more and 85° or less. Moreover, the thickness and orientation angle are uniform in the width direction.

Also, since the tension from the grasping means acts on the film uniformly in the width direction, birefringence generated by molecular orientation is uniform in the width direction. According to the producing method in the present invention, a film with the average retardation Re ($=(n_x−n_y)\times d$; $n_x$ and $n_y$ are in-plane principal refractive indexes of the film, d is a thickness of the film) of 100 to 300 nm can be easily obtained. Also, by reducing the angle Φ or by increasing $Re_1$ and $Re_2$, a obliquely stretched film having a large Nz coefficient can be obtained, while by increasing the angle Φ or by reducing $Re_1$ and $Re_2$, a obliquely stretched film having a small Nz coefficient can be obtained. The Nz coefficient is a value represented by $(n_x−n_z)/(n_x−n_y)$ when the refractive index in the film thickness direction is $n_z$.

The long obliquely stretched film obtained by the producing method in the present invention is preferably 1300 mm or more, and more preferably 1450 mm or more in width.

The average thickness of the obliquely stretched film obtained by the producing method in the present invention is preferably 30 to 80 μm, more preferably 30 to 60 μm, and particularly preferably 30 to 50 μm, from the viewpoint of mechanical strength.

In the thickness fluctuation in the width direction of the obliquely stretched film obtained by the producing method in the present invention, a difference between the maximum thickness and the minimum thickness is usually 3 μm or less, and preferably 2 μm or less. If the thickness fluctuation is in this range, the obliquely stretched film obtained by the producing method in the present invention can be taken up lengthily.

The obliquely stretched film obtained by the producing method in the present invention has Re fluctuation usually within 10 nm, preferably within 5 nm, and more preferably within 2 nm. In the present invention, since the Re fluctuation can be kept in the above range, when used in a liquid crystal display device, its display quality can be made favorable. Here, the Re fluctuation is a difference between the maximum value and the minimum value of Re when Re at a light incident angle 0° (state where an incident light beam and a surface of the obliquely stretched film of the present invention bisect at right angles) is measured in the width direction of the obliquely stretched film.

The Nz coefficient of the stretched film obtained by the producing method in the present invention is preferably 1.5 or more, more preferably more than 2.0, and particularly preferably 2.1 or more.

An upper limit value of the Nz coefficient is preferably 10, more preferably 5, and further preferably 3.

In order to have the Nz coefficient of 1.5 or more, $Re_1$ is set at 150 nm or more and 1000 nm or less and $Re_2$ at 0.4 times or more and less than 1 times of $Re_1$. Moreover, at this time, θe is preferably 5° or more and 30° or less.

In order to have the Nz coefficient in a range exceeding 2.0, $Re_1$ is set at 250 nm or more and 1000 nm or less and $Re_2$ at 0.5 times or more and less than 1 times of $Re_1$. Moreover, at this time, θe is preferably 5° or more and 20° or less.

In order to have the Nz coefficient of 2.1 or more, $Re_1$ is set at 250 nm or more and 1000 nm or less and $Re_2$ at 0.7 times or more and less than 1 times of $Re_1$. Moreover, at this time, θe is preferably 5° or more and 20° or less.

A content of a residual volatile component in the obliquely stretched film obtained by the producing method in the present invention is not particularly limited but it is preferably 0.1% by weight or less, more preferably 0.05% by weight or less, and further preferably 0.02% by weight or less. If the content of the residual volatile component exceeds 0.1% by weight, there is a fear that its optical characteristics will change over time. By keeping the content of the volatile component in the above range, dimensional stability is improved, temporal change in average retardation (Re) in the in-plane or average retardation (Rth) in the thickness direction can be reduced, and moreover, deterioration of a polarizing plate or liquid crystal display device having a obliquely stretched film of the present invention can be restricted, which can keep display of the display device stable and favorable for a long time. The residual volatile component is a substance with a molecular weight of 200 or less which is contained in a small amount in the film, and for example, is a residual monomer, solvent or the like. The content of the residual volatile component can be quantified by analysis of the film using gas chromatography as a total of substances with the molecular weight of 200 or less contained in the film.

A saturated water absorption of the obliquely stretched film obtained by the producing method in the present invention is preferably 0.03% by weight or less, more preferably 0.02% by weight or less, and particularly preferably 0.01% by weight or less. By having the saturated water absorption in the above range, temporal change in average retardation (Re) in the in-plane and average retardation (Rth) in the thickness direction can be reduced, and moreover, deterioration of a polarizing plate or liquid crystal display device having a obliquely stretched film obtained by the producing method in the present invention can be restricted, which can keep display of the display device stable and favorable for a long time.

The saturated water absorption is a value expressed in percentage of an increased mass obtained by dipping a test film sample in water at a given temperature for a given time to a test sample mass before dipping. Usually, measurement is made by dipping in water with a temperature of 23° C. for 24 hours. The saturated water absorption in the obliquely stretched film obtained by the producing method in the present invention can be adjusted to the above value by reducing an amount of polar group in a thermoplastic resin, for example, and a resin without a polar group is preferable.

The long obliquely stretched film obtained by the producing method in the present invention can be laminated with a long polarizer to obtain a long laminate film.

The polarizer used in the present invention transmits one of two linear polarized lights at right angles to one another. For example, a polarizer obtained by having iodine or dichroic substances such as dichroic dye adsorbed to a hydrophilic polymer film such as a polyvinyl alcohol film and ethylene-vinyl acetate partially saponified film and the like and then, uniaxially stretched, or the one obtained by uniaxially stretching the hydrophilic polymer film and having dichroic substance absorbed or a polyene oriented film such as dehydrated polyvinyl alcohol or dehydrochlorinated polyvinyl chloride and the like can be mentioned. In addition, reflective polarizers such as grid polarizer and anisotropic multi-layer film can be mentioned. The thickness of the polarizer is usually 5 to 80 μm.

The obliquely stretched film obtained by the producing method in the present invention may be laminated either on both faces or one face of a polarizer, and the number of laminating layers is not particularly limited and two or more layers may be laminated.

If the obliquely stretched film is laminated only on one face of the polarizer, a protective film with a purpose of protecting the polarizer may be laminated on the other face through an appropriate adhesive layer.

As the protective film, an appropriate transparent film may be used. Among them, a film having resin with transparency, excellent mechanical strength, thermal stability, water shielding performance and the like is preferably used. Examples of such a resin include acetate polymer such as triacetylcellulose, alicyclic olefin polymer, polyolefin polymer, polycarbonate polymer, polyester polymer such as polyethylene terephthalate, polyvinyl chloride polymer, polystyrene polymer, polyacrylonitrile polymer, poly sulphone polymer, polyethersulphone polymer, polyamide polymer, polyimide polymer, acrylic polymer and the like.

A suitable method for producing a long laminate film in the present invention is a method comprising close contact between a obliquely stretched film and a polarizer while winding them off a obliquely stretched film winding body and a polarizer winding body, respectively, at the same time. An adhesive may be interposed in a close-contact face between the obliquely stretched film and the polarizer. As a method of bringing the obliquely stretched film and the polarizer into close contact, a method of inserting the obliquely stretched film and the polarizer together into a nip of two rolls aligned in parallel for pressure sandwiching.

A long obliquely stretched film or long laminate film in the present invention is used as a retarder or a polarizing plate by cutting it into a desired size according to its use form. In this case, it is preferable to cut out along a direction perpendicular or parallel to the longitudinal direction of the long film.

A liquid crystal display device in the present invention is composed of a retarder or a polarizing plate cut out of the long obliquely stretched film or the long laminate film. An example of the liquid crystal display device of the present invention includes a device constituted by a liquid crystal panel whose polarizing transmission axis can be changed by adjustment of an electric voltage and the polarizing plate of the present invention arranged so as to sandwich the panel. Also, the retarder of the present invention is used in a liquid crystal display device for optical compensation and polarizing light conversion and the like. The liquid crystal display device is usually provided with a backlight device for a transmission type liquid crystal display device or a reflecting plate for reflective type liquid crystal display device on the back side of a display face in order to feed light into the liquid crystal panel. A light source used for the back light includes cold cathode-ray tube, mercury plane lamp, light-emitting diode, EL and the like. As the liquid crystal display device of the present invention, a reflective type liquid crystal display device composed of a reflective type liquid crystal panel is preferable. The liquid crystal panel is not particularly limited by its display mode. For example, TN (Twisted Nematic) mode, STN (Super Twisted Nematic) mode, HAN (Hybrid Alignment Nematic) mode, VA (Vertical Alignment) mode, WA (Multi-domain Vertical Alignment) mode, IPS (In Plane Switching) mode and the like can be cited. In the liquid crystal display device of the present invention, an appropriate part such as prism array sheet, lens array sheet, diffusing sheet, light diffusing plate, light guide plate, brightness improving film and the like may be arranged in one or two layers or more at an appropriate position in addition to the above.

The obliquely stretched film obtained by the producing method in the present invention can be applied to an organic EL display device, plasma display device, FED (Field Emission Display) device, and SED (Surface-conduction Electron-emitter Display) device other than the liquid crystal display device.

EXAMPLES

Evaluation is made by the following method in the examples.
(Average Thickness, Thickness Fluctuation)
A thickness was measured with a 5-cm interval in the film width direction using a snap gauge (produced by Mitutoyo corporation, ID-C112BS) and an average value was acquired. The thickness fluctuation was set as a difference between the maximum value and the minimum value in the thickness.
(Average Orientation Angle, Orientation Angle Fluctuation)
A retardation axis in a plane was measured with a 5-cm interval in the film width direction using a polarizing microscope (produced by Olympus Corporation, BX51) and an average value of an angle (orientation angle) formed by a direction of the retardation axis and the width direction was acquired. The orientation angle fluctuation was set as a difference between the maximum value and the minimum value of the orientation angle.
(Average Re, Average Nz Coefficient)
Re and Nz coefficient were measured with a 5-cm interval in the film width direction using a phase difference detector (produced by Oji Scientific Instruments, KOBRA21-ADH) according to formulas (1) and (2) and an average value was acquired. The Re fluctuation was set as a difference between the maximum value and the minimum value of Re.

$$Re = (n_x - n_y) \cdot d \quad (1)$$

$$Nz = (n_x - n_z)/(n_x - n_y) \quad (2)$$

three-dimensional refractive indexes, $n_x$, $n_y$, $n_z$, thickness d

Example 1

A pellet of norbornene resin (by Zeon corporation, ZEONOR1420) was molded by a T-die type film extrusion molding machine so as to have a long unstretched film (A) with a width of 1000 mm and a thickness of 130 μm. The unstretched film (A) was taken up by a roll.

Then, the unstretched film (A) was wound off the roll, supplied to a longitudinal stretching machine, and longitudinally stretched under a stretching condition shown in Table 1 so as to have a longitudinally stretched film (B) with characteristics shown in Table 2. The longitudinally stretched film (B) was taken up by another roll.

Moreover, the longitudinally stretched film (B) was wound off the roll, supplied to a tenter stretching machine shown in FIGS. 1 to 3, stretched under the stretching condition shown in Table 1 in a direction obliquely at 10° to the width direction of the longitudinally stretched film (B) so as to have a obliquely stretched film (C), and the film (C) was further taken up by an added roll so as to have a obliquely stretched film winding body. The film (C) had an orientation axis of an average orientation angle of 75° with respect to the width direction. The properties of the film (C) are shown in Table 2.

TABLE 1

| | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Film (A) | Average Re [μm] | 2 | 2 | 2 | 2 | 2 | 2 | 2 |
| Longitudinal stretching | Stretching Temp. [° C.] | 142 | 142 | 142 | — | — | 142 | 142 |
| | Stretching magnification [times] | 1.8 | 1.8 | 1.8 | — | — | 1.8 | 1.8 |
| | Take-up speed [m/min.] | 20 | 20 | 20 | — | — | 20 | 20 |
| | Stretching direction [°] | 90 | 90 | 90 | — | — | 90 | 90 |
| | $Re_1$ [nm] | 273 | 273 | 273 | 2 | 2 | 273 | 273 |
| Tenter stretching | $Re_2$ [nm] | 85 | 238 | 55 | 200 | 160 | 382 | 365 |
| | $\theta 1$ [°] | 7 | 32 | 16 | 75 | 70 | 7 | 19 |
| | Stretching temp. [° C.] | 148 | 142 | 145 | 145 | 155 | 145 | 143 |
| | Stretching magnification [times] | 1.5 | 1.8 | 1.3 | 1.6 | 1.8 | 2.5 | 2 |
| | Take-up speed [m/min.] | 20 | 18 | 15 | 16 | 17 | 20 | 18 |
| | $\theta e$ [°] | 10 | 35 | 20 | 75 | 70 | 10 | 23 |
| | L [mm] * | 276 | 1315 | 494 | 6231 | 5161 | 460 | 877 |
| | Width after stretching [mm] | 1565 | 1878 | 1357 | 1670 | 1878 | 2609 | 2086 |
| | Stretched film | (C) | (D) | (E) | (F) | (G) | (H) | (I) |

* L is a distance between a stretching end point E2
— a fixing zone start point in FIG. 2

TABLE 2

| | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Film | (A) | (B) | (C) | (D) | (E) | (F) | (G) | (H) | (H) |
| Width [mm] | 1400 | 1043 | 1565 | 1878 | 1357 | 1670 | 1878 | 2609 | 2086 |
| Average thickness [μm] | 130 | 97 | 65 | 54 | 75 | 81 | 72 | 39 | 50 |
| Thickness fluctuation [μm] | 1 | 1 | 2 | 2 | 2 | 10 | 10 | 2 | 3 |
| Average Re [nm] | 2 | 273 | 137 | 68 | 185 | 200 | 160 | 182 | 158 |
| Re fluctuation [nm] | 1 | 3 | 1 | 3 | 2 | 20 | 18 | 3 | 4 |
| Average Nz [—] | — | 1.0 | 2.2 | 1.4 | 1.6 | 1.2 | 1.2 | 1.8 | 1.3 |
| Average orientation angle $\theta s$ [°] | 0 | 90 | 75 | 45 | 60 | 72 | 68 | 8 | 20 |
| Orientation angle fluctuation [°] | 1 | 1 | 1 | 2 | 1 | 8 | 7 | 1 | 5 |
| Presence of wrinkle | none | none | none | none | none | yes | yes | none | none |

Example 2

The long longitudinally stretched film (B) obtained in Example 1 was wound off the roll, supplied to a tenter stretching machine, stretched in a direction obliquely at 10° with respect to the width direction of the longitudinally stretched film (B) under the stretching condition shown in Table 1 so as to obtain a obliquely stretched film (D). And the film (D) was taken up by an added roll so as to have a obliquely stretched film winding body. The film (D) had an orientation axis of an average orientation angle of 45° with respect to the width direction and had properties shown in Table 2.

Example 3

The long longitudinally stretched film (B) obtained in Example 1 was wound off the roll, supplied to a tenter stretching machine, stretched in a direction obliquely at 15° with respect to the width direction of the longitudinally stretched film (B) under the stretching condition shown in Table 1 so as to obtain a obliquely stretched film (E). Moreover the film (E) was taken up by an added roll so as to have a obliquely stretched film winding body. The film (E) had an orientation axis of an average orientation angle of 75° with respect to the width direction and had properties shown in Table 2.

Comparative Example 1

According to the method described in Japanese Patent Laid-Open No. 2-113920, the long unstretched film (A) obtained in Example 1 was supplied to the tenter stretching machine set to angle, temperature and stretching magnification shown in Table 1 so as to have a obliquely stretched film (F). The film (F) had wrinkles left on the entire face and can not be taken up by a added roll. The properties of the stretched film (F) are shown in Table 2.

Comparative Example 2

The long unstretched film (A) obtained in Example 1 was supplied to the tenter stretching machine set to angle, temperature and stretching magnification shown in Table 1 so as to have a obliquely stretched film (G). The film (G) had wrinkles left on the entire face and can not be taken up by an added roll. The properties of the stretched film (G) are shown in Table 2.

Comparative Example 3

The long longitudinally stretched film (B) obtained in Example 1 was wound off the roll, supplied to the tenter stretching machine, stretched in a direction obliquely at 10° with respect to the width direction of the longitudinally stretched film (B) under the stretching condition in Table 1 so as to have a obliquely stretched film (H). The film (H) was further taken up by a added roll so as to have a obliquely stretched film winding body. An average orientation angle of the film (H) with respect to the width direction was 8°. The other properties are shown in Table 2.

Comparative Example 4

The long longitudinally stretched film (B) obtained in Example 1 was wound off the roll, supplied to the tenter stretching machine, stretched in a direction obliquely at 23° with respect to the width direction of the longitudinally stretched film (B) under the stretching condition in Table 1 so as to have a obliquely stretched film (I). The film (I) was further take up by a added roll so as to have a obliquely stretched film winding body. An average orientation angle of the film (I) with respect to the width direction was 20°, but the result was a large orientation-angle fluctuation. The other properties are shown in Table 2.

From the results of Comparative Examples 1 and 2, it is known that even if a obliquely stretched film with an average orientation angle of 45° or more to the width direction is to be obtained, wrinkles are generated and the film can not be used as an optical film. Also, from the results of Comparative Examples 1 to 4, it is known that if $Re_2$ is at $Re_1$ or more, an orientation axis emerges in a direction substantially equal to the angle $\theta e$. At this time, it is known that if the orientation angle becomes large, fluctuation in physical properties of the obtained stretched film also becomes large (see Comparative Example, 1, 2, and 4).

On the other hand, according to the producing method in the present invention, it is known that a obliquely stretched film with an average orientation angle of 45° or more with respect to the width direction (Examples 1 to 3) can be manufactured without generating a wrinkle. Also, even if the stretching angle $\theta e$ in the obliquely stretching process is small, an orientation angle of the obtained stretched film can be increased, and an orientation axis of the stretched film can be generated with accuracy in a direction between the stretching direction in the longitudinal stretching process and the stretching direction in the obliquely stretching process. Moreover, the obtained stretched film has a large width and small fluctuation of thickness or of Re.

The invention claimed is:

1. A long phase difference film which has an orientation axis in a direction with an angle $\theta s$ of 40° or more and 85° or less from a width direction and an Nz coefficient in the range of 1.4 to 10.

2. The phase difference film according to claim 1, in which the Nz coefficient is in the range of 1.5 to 10.

3. The phase difference film according to claim 1, in which the angle $\theta s$ of the orientation axis is 51° or more and 85° or less.

4. The phase difference film according to claim 1, which is from 100 nm to 300 nm in an average retardation $Re_2$.

5. The phase difference film according to claim 1, which is not more than 10 nm in a fluctuation of retardation.

6. The phase difference film according to claim 1, which comprises a resin having a positive specific birefringence.

7. The phase difference film according to claim 1, which is 1300 mm or more in width and 30 μm to 80 μm in an average thickness.

8. The phase difference film according to claim 1, which is not more than 3 μm in a fluctuation of thickness.

9. The phase difference film according to claim 1, which is not more than 0.1% by weight in a content of a residual volatile component.

10. The phase difference film according to claim 1, which is not more than 0.03% by weight in a saturated water absorption.

11. The phase difference film according to claim 1, which is not more than 2° in a fluctuation of angle θs of the orientation axis.

12. The phase difference film according to claim 1, which is obtained by stretching a long raw material film.

13. The phase difference film according to claim 1, which is obtained by obliquely stretching a longitudinally stretched film.

14. The phase difference film according to claim 13, in which the longitudinally stretched film has an average retardation $Re_1$ of 150 nm to 1000 nm.

15. The phase difference film according to claim 14, in which the average retardation $Re_2$ is 100 nm to 300 nm and the $Re_2$ is smaller than $Re_1$.

* * * * *